United States Patent [19]

Hellsten et al.

[11] Patent Number: 5,700,766
[45] Date of Patent: Dec. 23, 1997

[54] USE OF AN AMPHOTERIC SURFACTANT AS A FRICTION-REDUCING AGENT

[75] Inventors: Martin Hellsten, Ödsmål; Ian Harwigsson, Malmö, both of Sweden

[73] Assignee: Berol Nobel AB, Stenungsund, Sweden

[21] Appl. No.: 632,461

[22] PCT Filed: Oct. 17, 1994

[86] PCT No.: PCT/EP94/03431

§ 371 Date: Apr. 19, 1996

§ 102(e) Date: Apr. 19, 1996

[87] PCT Pub. No.: WO95/11288

PCT Pub. Date: Apr. 27, 1995

[30] Foreign Application Priority Data

Oct. 21, 1993 [SE] Sweden ................... 9303458

[51] Int. Cl.$^6$ .................. C10M 133/06; C10M 173/02
[52] U.S. Cl. ........................... 508/500; 508/513
[58] Field of Search .................... 508/500, 513

[56] References Cited

U.S. PATENT DOCUMENTS

| | | | |
|---|---|---|---|
| 3,574,100 | 4/1971 | Wetmore | 252/32.5 |
| 3,766,068 | 10/1973 | Tesdahl et al. | 252/33.2 |
| 4,446,053 | 5/1984 | Skrobul et al. | 252/33.6 |
| 4,470,918 | 9/1984 | Mosier | 252/77 |
| 4,543,199 | 9/1985 | Kuntschik et al. | 252/75 |
| 4,548,726 | 10/1985 | Morris-Sherwood et al. | 508/513 |
| 5,062,978 | 11/1991 | Weber et al. | 508/500 |
| 5,565,127 | 10/1996 | Kaufenberger et al. | 508/513 |

FOREIGN PATENT DOCUMENTS

| | | | |
|---|---|---|---|
| WO 85/03083 | 7/1985 | WIPO | C09K 5/00 |
| WO 92/13925 | 8/1992 | WIPO | C09K 3/00 |
| WO 93/18120 | 9/1993 | WIPO | C10M 173/02 |

OTHER PUBLICATIONS

*International Search Report*, (WO/93/18120) PCT/EP93/00412, dated Jun. 16, 1993.

*Primary Examiner*—Jacqueline V. Howard
*Attorney, Agent, or Firm*—Ralph J. Mancini; Louis A. Morris

[57] ABSTRACT

An alkoxylated alkanolamide of general formula (I),

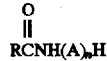

wherein R is a hydrocarbon group having 7–35 carbon atoms, preferably 9–23 carbon atoms, A is an alkyleneoxy group having 2–4 carbon atoms, and n is 2–20, preferably 3–12, is used for producing a water-based liquid system with reduced flow resistance between the flowing, water-base liquid system and a solid surface.

9 Claims, No Drawings

USE OF AN AMPHOTERIC SURFACTANT AS A FRICTION-REDUCING AGENT

The present invention relates to the use of an amphoteric surfactant in a water-base system for reducing the flow resistance between a solid surface and the water-base liquid system.

It is well-known that the flow resistance of a liquid in a conduit is largely due to the turbulence that arises at the conduit wall. Surfactants with the ability to form extremely long, cylindrical micelles have, in recent years, attracted a great interest as friction-reducing additives to systems with circulating water, especially those destined for heat distribution. An important reason for this interest is that, although one desires to maintain a laminar flow in the conduits, one wishes at the same time to have turbulence in the heat exchangers to achieve therein a high heat transfer per unit area.

The rod-shaped micelles are distinguished by operating in a fairly disorderly fashion at low Reynold's numbers (below $10^4$), and having no or only a very slight effect on the flow resistance. At higher Reynold's numbers (above $10^4$), the micelles are paralleled and result in a friction reduction very close to that which is theoretically possible. At even higher Reynold's numbers (e.g. above $10^5$), the shear forces in the liquid become so high that the micelles start to get torn and the friction-reducing effect rapidly decreases as the Reynold's numbers increase.

The range of Reynold's numbers within which the surface-active agents have a maximum friction-reducing effect is among others dependent on the concentration, the range increasing with the concentration.

By choosing the right concentration of surface-active agents and suitable flow rates in tubings and heat exchangers, it is thus possible to establish a laminar flow in the tubes and turbulence in the heat exchangers. Thus, the dimensions of both the tubes and the exchangers can be kept at a low level, or the number of pump stations, and consequently the pump work, can alternatively be reduced while retaining the same tubular dimensions.

Most of the surface-active agents hitherto used as friction-reducing additives to circulating water system—mainly destined for heat distribution, see for example WO 85/03083—are cationic surfactants like $C_{16-18}$-alkyltrimetyl ammonium salicylate. However, this type of surface-active agent is slowly degraded, both aerobically and anaerobically, and is highly toxic to marine organisms. Since heat-distribution systems usually suffer from important leaks (it is estimated that in one year 60–100% of the water leaks out), it follows that the added chemicals end up in the ground water and in various fresh-water recipients. This combination of low biodegradability and high toxicity is a fundamental criterion for a product injurious to the environment.

In the Swedish Patent publication No 467 826 it is disclosed that nonionic, alkoxylated alkanolamides may be used as friction-reducing agents. These nonionic surfactants have an excellent friction reducing effect at low or moderate temperatures but at higher temperatures the friction reducing effect is less satisfactory and may even be lost.

It has now surprisingly been found that a water-soluble amphoteric surfactant containing i) one or more, preferably one or two, monovalent hydrophobic groups, preferably hydrocarbon groups, forming a hydrophobic portion containing 10–36 carbon atoms, ii) one or more, preferably one or two primary, secondary or tertiary amine groups and iii) one or more, preferably one or two carboxylic groups and having a molecular weight of less than 1400, preferably less than 800, or a salt thereof has the ability to form long cylindrical micelles. The amphoteric surfactant may also contain one or more nonionic, hydrophilic groups, such as hydroxyl groups and ether groups. This type of amphoteric surfactant has an excellent friction-reducing effect well adapted for aqueous heat transfer systems. Furthermore, the effect of the amphoteric surfactant on the environment is low, especially in comparison with the previous used cationic friction-reducing agents. The amount of the amphoteric friction-reducing agent may vary within wide limits depending on the conditions but generally is 100–10.000 $g/m^3$ of the aqueous heat transfer liquid.

Suitable amphoteric surfactants to be used as friction-reducing agents are those surfactants which have the formula

where $R_1$, $R_3$, $R_4$ and $R_5$ independently are carboxyalkyl groups with 2–22, preferably 2–4 carbon atoms or dicarboxyalkyl groups with 3–22, preferably 3–4 carbon atoms, or the group

where R is hydrogen or an hydrocarbon group with 1–22 carbon atoms, A is —$OCH_2CH(OH)CH_2$—, —$C(O)$— or —$CH(OH)CH_2$—, r and s are numbers from 2–4, p and n are numbers from 0–10, v is a number 0 or 1, and q is a number 0 or 1, with the proviso that p is 0 when A is —$CH(OH)CH_2$—, and p and n are both zero when A is —$C(O)$—, at least one of $R_1$, $R_3$, $R_4$ and $R_5$ being the dicarboxyalkyl or carboxyalkyl group and at least one of $R_1$, $R_3$, $R_4$ and $R_5$ being the group with formula (II) having an R group with 8–22, preferably 10–18 carbon atoms, the total number of carbon atoms in all R groups being 8–36, preferably 10–32 carbon atoms; $R_2$ being an alkylene group with 2–3 carbon atoms and u is a number from 0–3, preferably 0–1.

One preferred group of compounds with formula (I) are those with the formula

where one or two of $R_1$, $R_3$ and $R_4$ independently are carboxyalkyl with 2–22, preferably 2–4 carbon atoms or dicarboxylic groups with 3–22, preferably 3–4 carbon atoms and one or two of $R_1$, $R_3$ and $R_4$ independently are the group

where R, r, p, A q, s, n and v have the meaning mentioned above, at least one of $R_1$, $R_3$ and $R_4$ being a group with formula (IV) having an R group with 8–20, preferably 10–18 carbon atoms, the total number of carbon atoms in all R groups being 8–36, preferably 10–32. Preferably, q is 1 and s and n are 0.

In formulae (II) and (IV) the R-groups are preferably an aliphatic group. Examples of suitable acyclic groups are octyl, decyl, dodecyl, hexadecyl and octadecyl. In case R is an alkylaryl group like octylphenyl, nonylphenyl or dodecylphenyl, then p is preferably 1–5 and A the group —OCH$_2$CH(OH)CH$_2$—. The groups —OC$_x$H$_{2x}$— and —OC$_y$H$_{2y}$— are preferably oxyethylene groups. Especially advantages friction reducing effects have been shown by N-(2-hydroxyalkyl)sarcosinates where the alkyl group is saturated or unsaturated, branched or unbranched and contains 16–20 carbon atoms.

The friction-reducing effect of the surfactants according to the invention is affected of both the temperature and the pH-value of the solution. The temperature effect depends on wether the surfactant contains glycol ether groups, or not. If no such groups are present, the surfactant will be more hydrophilic with increasing temperature. The presence of glycol ether groups will affect the surfactant to be more hydrophobic when the temperature is increasing. The relative amount of the glycol ether groups to the ionic groups i.e. the amino and carboxylic groups will thus determine wether the surfactant will be more hydrophilic or hydrophobic when the temperature is changed.

The balance between the hydrophilic and hydrophobic parts of the surfactant is important for its function as a friction-reducing additive. By using a proper balance between the number of ionic groups and nonionic groups it is possible to design amphoteric surfactants with a small temperature dependence which then can be used as friction reducing agents within a wide temperature range.

The hydrophilicity of the amphoteric surfactants according to this invention is also affected by the pH-value of the water-base liquid system. Within the pH-range of 5–11 an increase of the pH will increase the hydrophilicity of the ionic groups and due to that the friction-reducing properties of the amphoteric surfactant are affected. This is of importance because the amphoteric surfactant can be adjusted to give optimal performance within a certain temperature range by an addition of an acid or a base. Also contaminations with an influence on the surfactants micellar shape, such as hydrocarbons or higher alcohols, may be compensated for by an adjustment of the pH-value.

The aqueous heat transfer system contains at least 50%, preferably at least 90% by weight of water. Apart from the amphoteric surfactant it may also contain a number of conventional components such as corrosion-preventing agent, anti-freeze, bactericides and solubilizers.

The amphoteric compounds with formula (I) may be produced in a number of ways. The following Examples illustrate some of the most conventional methods. In the formulae R, R$_4$ and p have the meaning mentioned earlier.

1. A higher alkyl amine is added to the Na-salt of fumaric acid

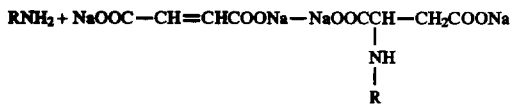

2. A dialkylamine is added to acrylic acid ethyl ester

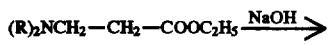

3. A higher alkane-1,2-epoxide is added to sarcosine:

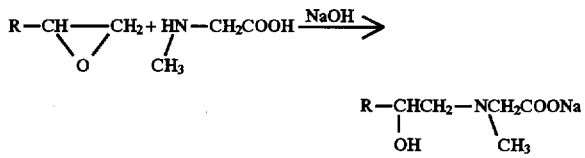

4. A higher alcohol is first ethoxylated with p moles of ethylene oxide per mole alcohol and to this product is one mole epichlorohydrin added with tin(IV)chloride as catalyst:

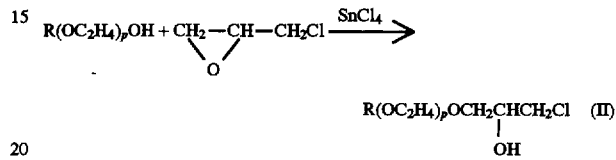

The product II is then treated with alkali to give the corresponding epoxide:

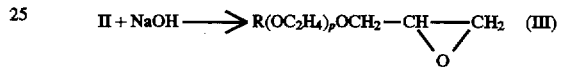

Two moles of this epoxide III are then added to one mole of glycine:

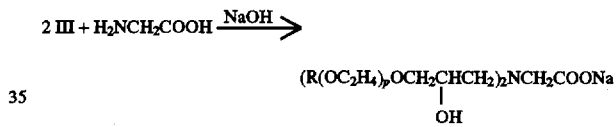

5. An α-halogenated carboxylic acid is treated with ammonia or a primary or secondary alkylamine to give the wanted amphoteric compound:

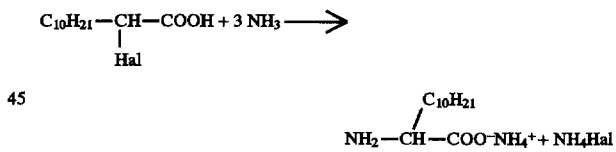

6. One mol of a fatty alkyl dipropylenetriamine is reacted with one mole of the compound CH$_2$=CHCOOC$_2$H$_5$, in order to carboxyethylate one of the amino groups. The ester group is then hydrolysed with alkali.

The present invention is further illustrated by the following Examples.

EXAMPLE

Measurements were carried out in a 6-m tube loop consisting of two straight and stainless tubes (3 m each), one tube having an inner diameter of 8 mm and the other having an inner diameter of 10 mm. Water was pumped through the tube loop by a centrifugal pump, which was driven by a frequency-controlled motor, for continuous adjustment of the flow rate, which was determined by a rotameter.

The straight parts of the tube loop had outlets which, with the aid of valves, could in turn be connected to a differential pressure gauge whose other side was all the time connected to a reference point in the tube loop. Further, the tube loop was heat-insulated, and the suction side of the pump was connected to a thermostatically controlled container with a volume of 20 l, to which the return flow from the tube loop was directed.

After the testing compound had been added and the aqueous solution had been thermostatically controlled, measurements began at low flow rates, and the pressure difference from two points on the 10-mm tube and three points on the 8-mm tube were measured for each flow rate. The pressure differences thus measured were then converted into Moody's friction factor Y and are shown in the Table below as a function of the Reynold's number Re.

$Y = 2D \cdot P_{diff} / V^2 \cdot L \cdot d$ $Re = D \cdot V \cdot d / u$

D=tube diameter

V=flow rate

L=tube length over which the pressure difference $P_{diff}$ was measured d=density of the liquid u=viscosity of the liquid The Table also states the corresponding Prandtl number and Virk number. The former corresponds to the friction factor of water only, i.e. with turbulence, and the latter corresponds to flow without turbulence.

In the tests performed one of the following compounds was added as a friction-reducing agent.

A. Cetyl trimetyl ammonium salicylate (comparison compound)

B. N-(2-hydroxy-cetyl)sarcosinate

C. N-(glyceryl myristyl ether)sarcosinate

D. N-cetyl sarcosinate

E. N-(2-hydroxystearyl)sarcosinate

F. N-$C_{16-18}$-alkyl iminodipropionate

TABLE 1

Compound A, addition 1000 ppm, temperature 50° C.

| Reynold's number × $10^{-4}$ | Moody's friction factor × $10^3$ | | | | |
|---|---|---|---|---|---|
| | 1 | 2 | 4 | 6 | 8 |
| Prandtl number × $10^3$ | 30 | 24 | 22 | 21 | 20 |
| 10 mm | 35 | 15 | 8.0 | 6.0 | 17 |
| 8 mm | 30 | 12 | 6.0 | 6.0 | 18 |
| Virk number × $10^3$ | 11 | 7.2 | 5.2 | 4.3 | 3.9 |

TABLE 2

Compound B, addition 500 ppm, temperature 66° C., pH-value 8.5

| Reynold's number × $10^{-4}$ | Moody's friction factor × $10^3$ | | | | |
|---|---|---|---|---|---|
| | 1 | 2 | 4 | 6 | 8 |
| Prandtl number × $10^3$ | 31 | 27 | 22 | 20 | 19 |
| 10 mm | 23 | 12 | 4.6 | 19 | 19 |
| 8 mm | 22 | 12 | 9.5 | 20 | 19 |
| Virk number × $10^3$ | 11 | 7.2 | 5.2 | 4.3 | 3.9 |

TABLE 3

Compound B, addition 500 ppm, temperature 98° C., pH value 8.2

| Reynold's number × | Moody's friction factor × $10^3$ | | | | | | | |
|---|---|---|---|---|---|---|---|---|
| $10^{-4}$ | 0.8 | 1.5 | 2.3 | 3.0 | 3.8 | 5.4 | 6.9 | 9.1 |
| Prandtl number × $10^3$ | 33 | 28 | 25 | 24 | 22 | 20 | 19 | 18 |
| 10 mm | 29 | 14 | 7 | 5 | 4 | 5 | 12 | 15 |
| 8 mm | 14 | 8 | 6 | 6 | 7 | 15 | 18 | 18 |
| Virk number × $10^3$ | 13 | 9 | 7 | 6 | 5 | 5 | 4 | 4 |

TABLE 4

Compound C, addition 2000 ppm, temperature 35° C., pH value 7.4

| | Moody's friction factor × $10^3$ | | | | |
|---|---|---|---|---|---|
| Reynold's number × $10^{-4}$ | 0.4 | 0.6 | 0.8 | 1 | 2 |
| Prandtl number × $10^3$ | 40 | 37 | 33 | 31 | 27 |
| 10 mm | 28 | 18 | 17 | 13 | 27 |
| 8 mm | 38 | 30 | 23 | 31 | 27 |
| Virk number × $10^3$ | 20 | 17 | 13 | 11 | 7.2 |

TABLE 5

Compound B, addition 1000 ppm, temperature 60° C., pH 9.0

| Reynold's number × | Moody's friction factor × $10^3$ | | | | | | |
|---|---|---|---|---|---|---|---|
| $10^{-4}$ | 1.15 | 1.4 | 1.7 | 1.9 | 2.1 | 2.4 | 2.9 |
| Prandtl number × $10^3$ | 30 | 28 | 27 | 26 | 25 | 25 | 24 |
| 10 mm | 15 | 16 | 17 | 14 | 12 | 12 | 12 |
| 8 mm | 23 | 18 | 15 | 12 | 11 | 9 | 15 |
| Virk number × $10^3$ | 10 | 9 | 8 | 7 | 7 | 7 | 6 |

TABLE 6

Compound E, addition 400 ppm, temperature 95° C., pH 9.0

| Reynolds number × | Moody's friction factor × $10^3$ | | | | | | | |
|---|---|---|---|---|---|---|---|---|
| $10^{-4}$ | 1.1 | 1.5 | 1.8 | 2.2 | 2.5 | 2.9 | 3.3 | 3.6 |
| Prandtl number × $10^3$ | 31 | 28 | 27 | 25 | 24 | 24 | 23 | 23 |
| 10 mm | 21 | 8 | 8 | 10 | 7 | 8 | 9 | 21 |
| 8 mm | 15 | 16 | 12 | 8 | 7 | 10 | 17 | 22 |
| Virk number × $10^3$ | 11 | 9 | 8 | 7 | 7 | 6 | 6 | 5.5 |

TABLE 7

Compound A, addition 400 ppm, temperature 70° C.

| | Moody's friction factor × $10^3$ | | | | | |
|---|---|---|---|---|---|---|
| Reynold's number × $10^{-4}$ | 1.1 | 1.9 | 2.5 | 3.4 | 5.0 | 7.7 |
| Prandtl number × $10^3$ | 31 | 27 | 24 | 23 | 20 | 19 |
| 10 mm | 60 | 34 | 30 | 25 | 20 | 18 |
| 8 mm | 44 | 29 | 26 | 24 | 20 | 18 |
| Virk number × $10^3$ | 11 | 8 | 7 | 6 | 5 | 4 |

TABLE 8

| Compound F, addition 1000 ppm, temperature 51° C., pH 5.4 | | | | | | | |
|---|---|---|---|---|---|---|---|
| Reynold's number × $10^{-4}$ | Moody's friction factor × $10^3$ | | | | | | |
|  | 0.83 | 1.03 | 1.24 | 1.45 | 1.65 | 1.86 | 2.07 |
| Prandtl number × $10^3$ | 31 | 30 | 29 | 28 | 27 | 26 | 26 |
| 10 mm | 19 | 24 | 19 | 19 | 27 | 28 | 27 |
| 8 mm | 25 | 17 | 12 | 14 | 14 | 16 | 28 |
| Virk number × $10^3$ | 12 | 11 | 10 | 9 | 8 | 8 | 7 |

From the results it is evident that the friction reducing agent in accordance with the invention essentially reduces the friction. In many cases the friction is reduced down towards the theoretical friction level of laminar flow (the Virk line). The improvements in comparison with the prior art (table 1 and 7) is of considerable magnitude at temperatures commonly used in aqueous heat distribution system. From the Tables 2, 3, 5 and 6 it is shown that according to the invention friction reducing agents have an excellent effect in the temperature interval from 60° to 98° C., while the comparison compound A has no or only a very low friction reducing effect at 70° C. (Table 7).

We claim:

1. A method for reducing the flow resistance between a solid surface and a water-based liquid system which comprises adding to said system a water soluble amphoteric surfactant having a molecular weight of less than 1400, or a salt thereof, wherein said amphoteric surfactant contains one or more monovalent hydrophobic groups forming a hydrophobic portion containing 10–36 carbon atoms; one or more primary, secondary or tertiary amine groups; and one or more carboxylic groups.

2. The method of claim 1 wherein the amphoteric surfactant has a molecular weight of less than 800 and contains one or two hydrocarbon groups containing together 12–22 carbon atoms.

3. The method of claim 1 wherein the amphoteric surfactant contains one or more nonionic, hydrophilic groups.

4. The method of claim 1 wherein the amphoteric surfactant has the formula

  (I)

wherein $R_1$, $R_3$, $R_4$ and $R_5$ independently are carboxyalkyl groups with 2–22 carbon atoms or dicarboxyalkyl groups with 3–22 carbon atoms, or the group

  (II)

wherein R is hydrogen or an hydrocarbon group with 1–22 carbon atoms, A is —OCH$_2$CH(OH)CH$_2$—, —C(O)—, or —CH(OH)CH$_2$—, r and s are numbers from 2–4, p and n are numbers from 0–10, v is a number 0 or 1 and q is a number 0 or 1 with the proviso that p is 0 when A is —CH(OH)CH$_2$— and p and n are both zero when A is —C(O)—, at least one of $R_1$, $R_3$, $R_4$ and $R_5$ is a dicarboxyalkyl or carboxyalkyl group and at least one of $R_1$, $R_3$, $R_4$ and $R_5$ is a group of the formula (II) having an R group with 8–22 carbon atoms, wherein the total number of carbon atoms is in all R groups being 8–36 carbon atoms; and $R_2$ is an alkylene group with 2–3 carbon atoms and u is a number from 0–3.

5. The method of claim 4 wherein the amphoteric surfactant has the formula

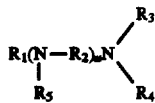  (III)

where one or two of $R_1$, $R_3$ and $R_4$ independently are carboxyalkyl with 2–4 carbon atoms or dicarboxyalkyl groups with 3–4 carbon atoms and one or two of $R_1$, $R_3$, and $R_4$ independently are the group

  (IV)

where R, r, p, A, q, s, n and v have the meanings mentioned above, at least one of $R_1$, $R_3$ and $R_4$ is a group of the formula (IV) having an R group with 10–18 carbon atoms, wherein the total number or carbon atoms in all R groups being 10–32.

6. The method of claim 5 wherein R is an aliphatic group, q is 1 and n is 0.

7. The method of claim 1 wherein the amphoteric surfactant is used in an amount of 100–10,000 g/m$^3$ of the water-base liquid system.

8. The method of claim 1 wherein the water-based liquid system is a heat transfer system.

9. The method of claim 8 wherein the temperature in the system is in the range of at least from 60° and 100° C.

* * * * *